Figure 1:
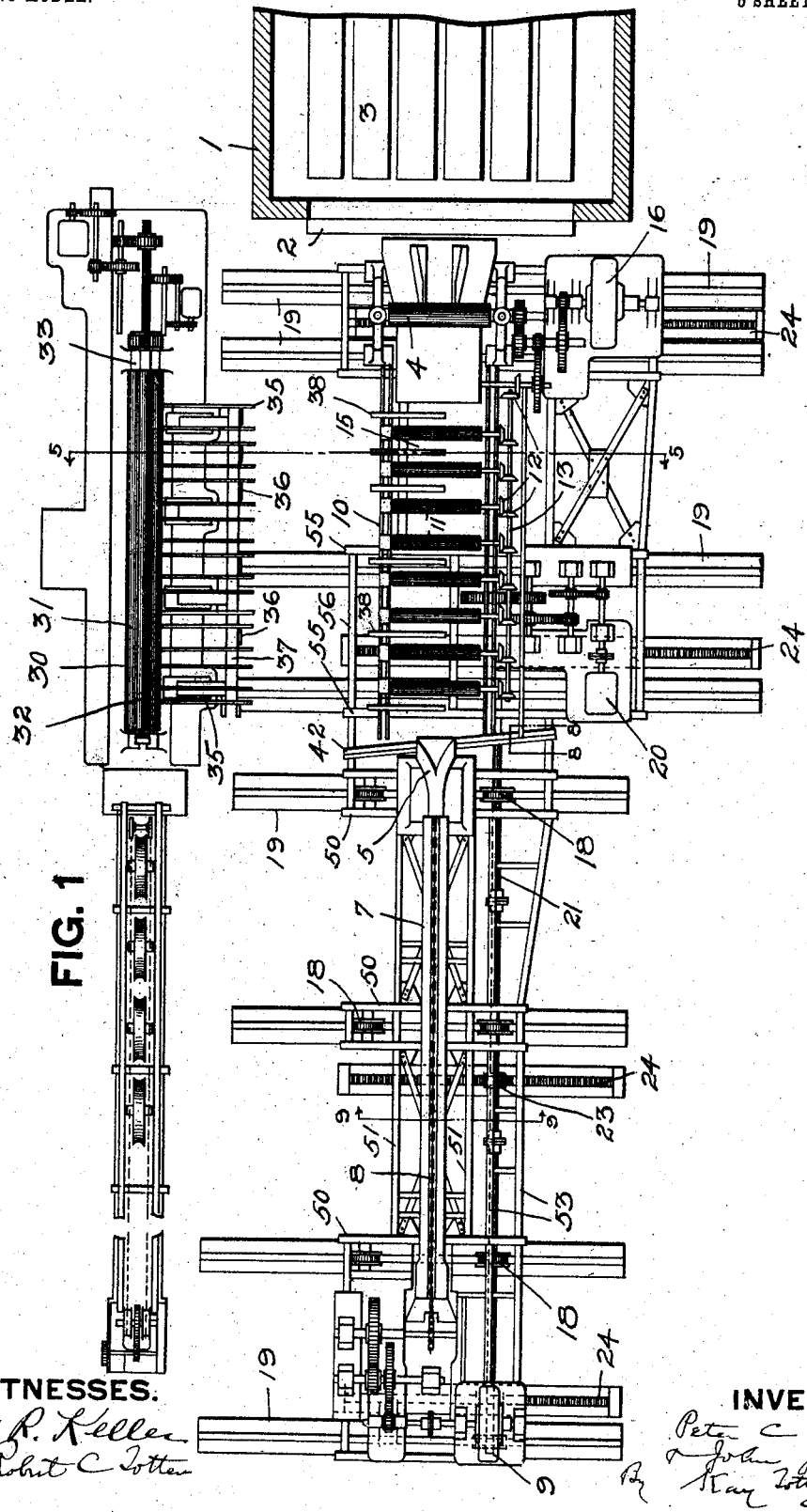

No. 772,579. PATENTED OCT. 18, 1904.
P. C. PATTERSON & J. J. BOAX.
SCARFING AND BENDING MACHINE.
APPLICATION FILED JAN. 23, 1904.
NO MODEL. 5 SHEETS—SHEET 1.

WITNESSES. INVENTORS

No. 772,579. PATENTED OCT. 18, 1904.
P. C. PATTERSON & J. J. BOAX.
SCARFING AND BENDING MACHINE.
APPLICATION FILED JAN. 23, 1904.
NO MODEL. 5 SHEETS—SHEET 2.
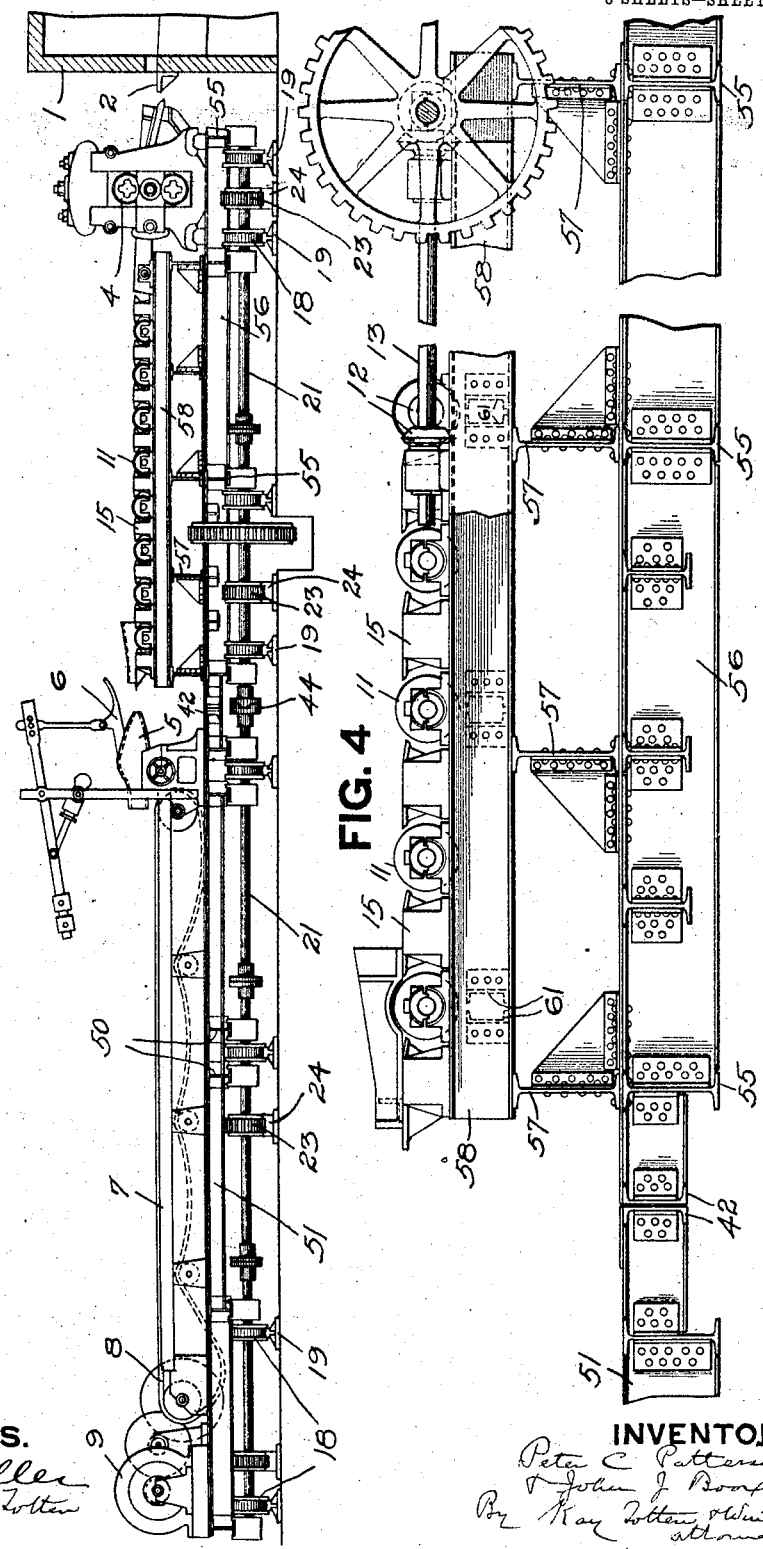
WITNESSES. INVENTORS

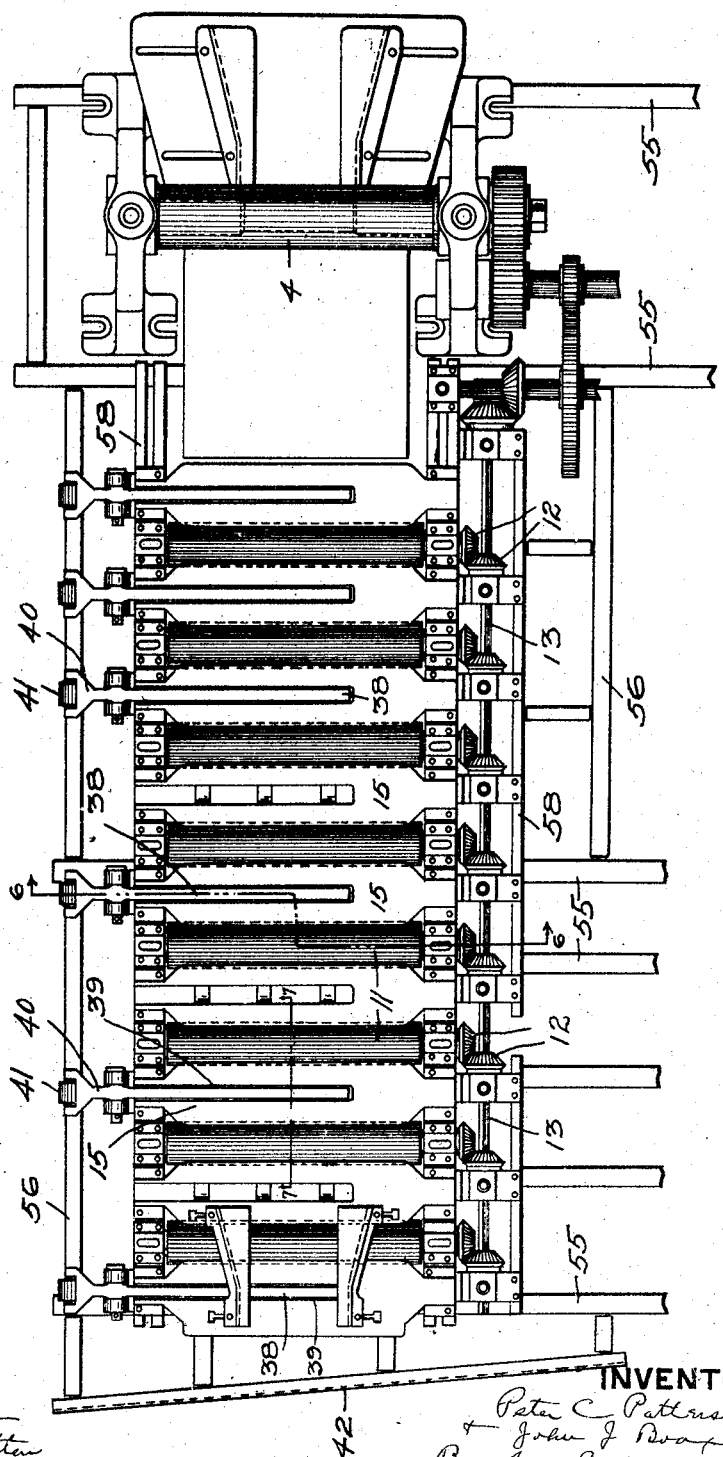

No. 772,579. PATENTED OCT. 18, 1904.
P. C. PATTERSON & J. J. BOAX.
SCARFING AND BENDING MACHINE.
APPLICATION FILED JAN. 23, 1904.
NO MODEL. 5 SHEETS—SHEET 4.
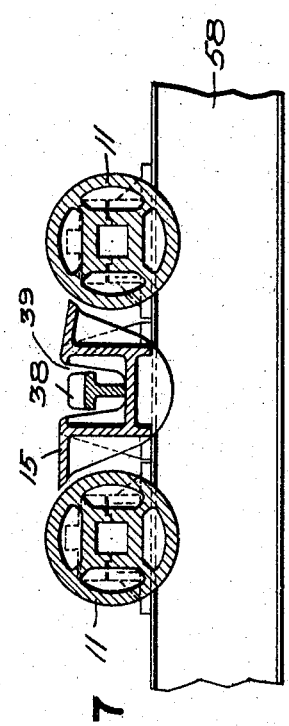
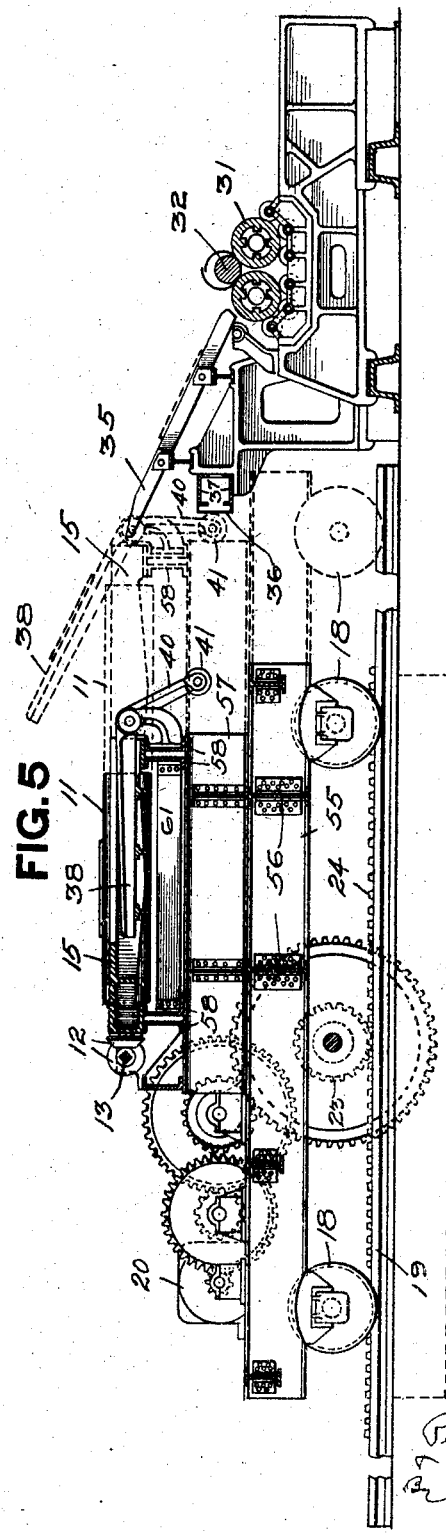
WITNESSES. INVENTORS No. 772,579. PATENTED OCT. 18, 1904.
P. C. PATTERSON & J. J. BOAX.
SCARFING AND BENDING MACHINE.
APPLICATION FILED JAN. 23, 1904.
NO MODEL. 5 SHEETS—SHEET 5.

WITNESSES. INVENTORS

No. 772,579. Patented October 18, 1904.

UNITED STATES PATENT OFFICE.

PETER C. PATTERSON AND JOHN J. BOAX, OF McKEESPORT, PENNSYLVANIA, ASSIGNORS TO NATIONAL TUBE COMPANY, OF PITTSBURG, PENNSYLVANIA, A CORPORATION OF NEW JERSEY.

SCARFING AND BENDING MACHINE.

SPECIFICATION forming part of Letters Patent No. 772,579, dated October 18, 1904.

Application filed January 23, 1904. Serial No. 190,383. (No model.)

*To all whom it may concern:*

Be it known that we, PETER C. PATTERSON and JOHN J. BOAX, residents of McKeesport, in the county of Allegheny and State of Pennsylvania, have invented a new and useful Improvement in Scarfing and Bending Machines; and we do hereby declare the following to be a full, clear, and exact description thereof.

Our invention relates to scarfing and bending machines for use in the manufacture of lap-weld tubing; and the object is to provide scarfing-rolls, a bending-die, bending-rolls, and transfer mechanism, so arranged as to transfer the plates from the scarfing-rolls to either the bending-die or the bending-rolls.

In the manufacture of lap-weld tubing the plates are heated in a furnace to a good bending temperature and are then pushed out of the same and into rolls which scarf or bevel the edges thereof in order to make a good lap-joint. These plates are then immediately bent into tubular form. Small-sized plates are bent by drawing the same through a suitable bell or die and over a mandrel coöperating therewith. For large-sized tubing, however, bending in dies is not satisfactory, and the practice is to bend them in suitable rolls. These bending-rolls comprise a group of three rolls of practically the length of the plate, two bottom rolls and a movable top roll, the plate being fed sidewise into the rolls and the movable top roll serving to press the same down into the angle formed by the bottom rolls, thus bending the same into tubular form.

Our invention relates to this general class of apparatus, and comprises an arrangement whereby both bending-rolls and bending-dies are located in proximity to the same furnace and scarfing-rolls and providing a transfer-table arranged to transfer the plates either to the bending-rolls or to the bending-dies.

In order to get a sufficient output from the furnace, the practice is to have a wide hearth and to place a series of plates side by side thereon, and the scarfing-rolls are laterally movable in front of the furnace, so that they may be brought in line with any one of the plates in the furnace. Intermediate the rolls and bending-dies is a transfer-table having power-driven rolls for feeding the plate from the scarfing-rolls to the bending-dies. The practice is to connect the bending-die, scarfing-rolls, and intermediate table in a single carriage. In our invention we follow this general arrangement, so that the scarfing-rolls and bending-die may be used in the manner now in vogue. The bending-rolls are placed at one side of the transfer-table, and said table is given sufficient lateral travel to carry the large-sized plates to the bending-rolls, means being provided for automatically discharging the plate from the table to the bending-rolls.

The invention also comprises a separable connection between the transfer-table and the bending-table, so that when used for bending large-sized plates in the rolls the bending-die can be disconnected and moved to one side, so as to use the minimum amount of power for moving the carriage laterally.

The invention also comprises certain details of construction and arrangement of parts hereinafter described and claimed.

Figure 6:
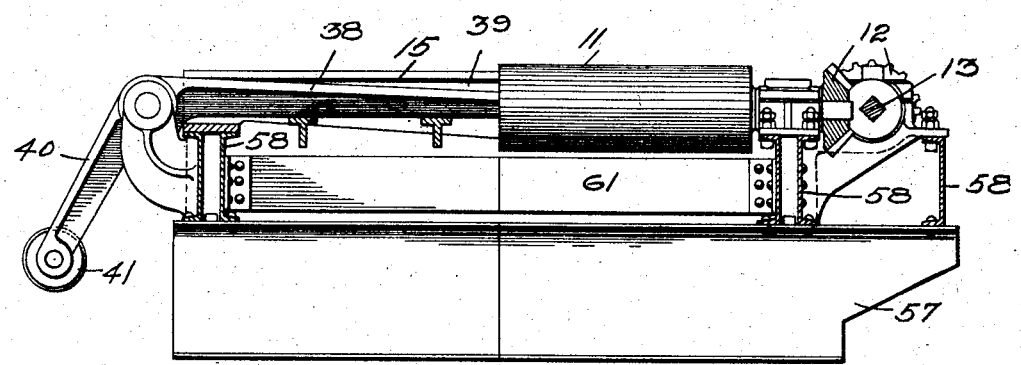
Figure 9:
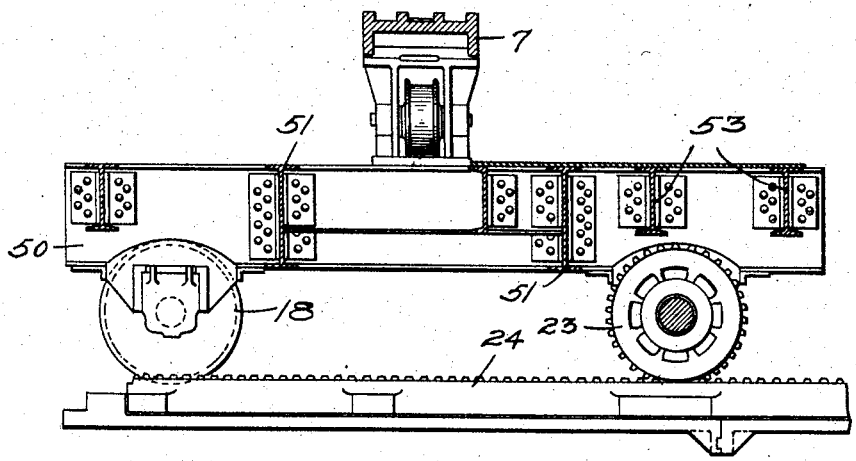
Figure 8:
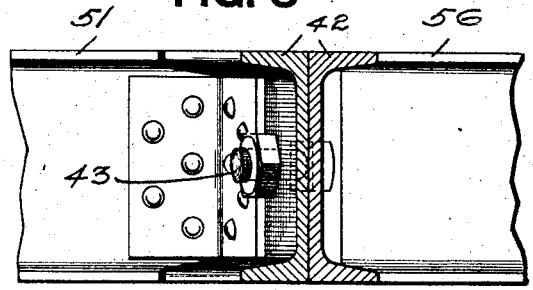

In the accompanying drawings, Figure 1 is a plan view showing the general arrangement of the mechanism. Fig. 2 is a side elevation thereof. Fig. 3 is a plan view, on an enlarged scale, of the scarfing-rolls and transfer-table. Fig. 4 is a side view of a portion of the apparatus on an enlarged scale. Fig. 5 is a cross-section on the line 5 5, Fig. 1. Fig. 6 is a cross-section on the line 6 6, Fig. 3. Fig. 7 is a longitudinal section on the line 7 7 of Fig. 3. Fig. 8 is a similar section on the line 8 8, Fig. 1; and Fig. 9 is a cross-section on line 9 9, Fig. 1.

The forward end of the bending-furnace is indicated at 1, and it has a wide hearth 2 for receiving thereon a series of plates 3. 4 indicates the scarfing-rolls, which may be of the usual or any preferred type. 5 is the bending-die, having a coöperating mandrel 6, and these also may be of the usual type employed for this purpose. 7 is the draw-bench for the bending-die, this draw-bench having a pulling-chain 8, driven from a motor 9 or any other suitable source of power and being arranged to have attached thereto the usual tongs or gripping device for pulling the plate through the die 5. All of these parts are well known in the art and will be understood without further description.

In the arrangement shown the bending-die and draw-bench are in line with the scarfing-rolls, and between the same is the transfer-table 10, having thereon a series of live rollers 11, driven by bevel-gears 12 from the longitudinal shaft 13, said rollers serving to feed the plate from the scarfing-rolls to the bending-die in the well-understood manner. On said table between the rollers 11 are the usual apron-plates 15. The scarfing-rolls may be driven from any suitable source of power, and in the drawings an electric motor 16 is shown for this purpose. The live rollers 11 may also be driven from any source of power, and in the drawings the shaft 13 is shown as driven from the electric motor 16.

The scarfing-rolls are laterally movable, as is customary, to bring them in line with all of the plates in the bending-furnace, and in the arrangement shown the bending-die and transfer-table are also laterally movable. All of these parts are shown as mounted on a practically-continuous carriage, which is provided with a series of wheels 18, running on tracks 19, placed on the mill-floor. This carriage can be moved on the tracks in any suitable way—such, for instance, as by means of stationary power-cylinders having their piston-rods connected to the carriage. It is desirable, however, to have the carriage self-contained, and hence it is driven from a motor mounted directly on the carriage. We have shown for this purpose an electric motor 20, mounted on the carriage and connected by suitable gearing to a longitudinal shaft 21, extending along the carriage and forming the axles of one of each pair of wheels 18, so that the carriage is in effect a motor-carriage. By reason of the great length of the carriage and of the fact that the front end is considerably heavier than the rear end there is danger of some of the wheels slipping, so that the carriage might not move in a straight line, but would tend to move diagonally. To avoid this, we provide on the shaft 21 a series of spur-wheels 23, which mesh with stationary racks 24 on the mill-floor. Four such gears and racks are shown, one at either end of the carriage and two intermediate said ends, so that both ends of the carriage will move in exact unison and said carriage will be prevented from assuming a diagonal position.

The operation of the apparatus so far described is in general the same as that heretofore in use when bending small-sized plates, the entire carriage being moved by means of the motor 20 transversely of the furnace and brought successively in front of each of the plates therein, the plates being pushed into the scarfing-rolls and thence fed by the rollers 11 to the bending-die, where they are gripped by the tongs connected to the chain 8 and pulled through the die.

In our arrngement we provide bending-rolls 30 at one side of the transfer-table 10 and sufficiently far away so as not to interfere with the traverse of said table in front of the furnace. These rolls are of the usual type, comprising two bottom rolls 31 and a single movable top roll 32. The plates will be fed sidewise between the top and bottom rolls and then the top roll will be forced down by any suitable means, so that in the rotation of said rolls the plate will be curled into tubular form. The bending-rolls are well known in the art, and specific illustration and description is not necessary. They are mounted in suitable housings 33 and will be driven by any suitable mechanism. On the side of the rolls toward the transfer-table 10 are a series of inclined skids 35, upon which the plates are deposited and down which they slide sidewise into the rolls. Also on the side toward the rolls are arranged a series of buffers or abutments 36, which are castings secured to frame channel-beams 37, or, if desired, the channel-beams themselves might form these abutments.

Pivoted at one edge of the transfer-table 10 are a series of tilting arms 38, which lie transversely of the table in depressions 39, formed in some of the apron-plates 15. These tilting arms are provided at their outer ends with downwardly-projecting portions 40, carrying at their lower ends friction-rollers 41, which are at such height that when the carriage is run sufficiently far sidewise these rollers will contact with the abutments 36, thus causing the horizontal portions of the levers to be tilted upwardly, as indicated in dotted lines, Fig. 5, and causing the plate resting thereupon to slide down onto the skids 35 and thence down into the bending-rolls.

When using the bending-rolls, it is unnecessary to move the bending-die 5 and its draw-bench laterally. We therefore make the carriage carrying the scarfing-rolls, transfer-table, and bending-dies in two sections and provide separable connections between the two. The two sections are provided at their meeting ends with end pieces 42, (shown as channel-beams,) which are adapted to come into close contact and which can be secured together by bolts 43 or other suitable means. The longitudinal shaft 21 is also made in sections, which are connected by any suitable shaft-coupling, such as the interlocking couplings 44. By this arrangement the bending-dies and draw-bench may be connected to the transfer-table and moved therewith or they can be disconnected therefrom and allowed to remain stationary while the latter is moved laterally. In order to avoid friction in separating these parts, the end beams 42 are placed on an angle, as shown, so that as soon as the sections are moved slightly laterally relatively to each other they will entirely clear each other.

In the use of the device described when small-sized plates are being bent the two sections of the carriage will be fastened together and all portions thereof will travel in unison laterally of the furnace, the plates being scarfed and then fed by the rollers 11 directly to the bending-die. When large-sized plates are being heated in the furnace, the carriage will be moved entirely to one side, and the connecting means between the two sections will be removed. The scarfing-rolls and transfer-table will then be moved in front of the furnace, leaving the bending-die and drawbench at one side. When thus arranged, the plates are scarfed in the rolls and pass out upon the transfer-table lying over the arms 38, a suitable stop being provided to prevent the plates being fed by the rollers 11 off the end of the table. The carriage is then moved laterally toward the bending-rolls, and when it reaches the limit of its movement the rollers 41 will come into contact with the abutments 36, thus causing the arms 38 to be tilted upwardly to such position that the plate will slide down the same onto the skids 35 and will slide down these skids into the bending-rolls 30, by means of which the plate will be curled sidewise into tubular form. As soon as the plate is discharged from the carriage the latter will again be moved in front of the furnace and in line with another plate therein. Then this plate will be scarfed and the carriage again moved laterally to discharge the plate into the bending-rolls.

The carriage carrying the scarfing-rolls, transfer-table, and bending-dies is formed entirely of structural steel, thus greatly reducing the weight of the same over prior constructions and also making the same somewhat flexible, so that if it meets with undue obstruction it will yield and not fracture. This structural-steel frame may be built up in various forms, and, as shown in the drawings, that portion thereof carrying the bending-die and draw-bench is composed of a series of transverse flanged beams 50, preferably I-beams, on which the wheels 18 are journaled. These transverse beams are connected by longitudinal beams 51, which also are I-beams, and are connected to the transverse beams by knee-pieces. Two main longitudinal beams 51 are shown arranged symmetrically with reference to the draw-bench, and on one side thereof are two longitudinally-arranged beams 53, also connecting the transverse beams 50. At the rear end this carriage is considerably widened in order to make room for the motor 9 and its gearing. That portion of the carriage supporting the scarfing-rolls and transfer-table is also composed of transverse flanged members 55, preferably I-beams, on which the driving-wheels 18 are mounted and which are connected by longitudinal flanged beams 56, preferably I-beams. The scarfing-rolls are mounted directly upon this frame; but the transfer-table must be elevated above this frame, and hence is supported thereon by transverse I-beams 57, longitudinal beams 58, and transverse channel-bars 61, arranged in pairs, as shown.

All of the parts of the frame are united by suitable connecting members well known to structural-steel workers and will be braced and reinforced, as found necessary. The carriage as a whole, however, is very light compared to prior constructions having special cast-frames therefor.

What we claim is—

1. In a scarfing and bending device, the combination of the scarfing-rolls, a bending-die in line therewith, bending-rolls at one side thereof, and transfer mechanism intermediate the scarfing-rolls and die and arranged to transfer the scarfed plates either longitudinally to the die or laterally to the bending-rolls.

2. In a scarfing and bending device, the combination of the scarfing-rolls, a bending-die in line therewith, bending-rolls at one side thereof, a laterally-movable transfer-table intermediate the scarfing-rolls and die, means on said table for feeding the plate longitudinally to the die, and means for discharging the plate laterally from the table to the bending-rolls.

3. In a scarfing and bending device, the combination of scarfing-rolls, a transfer-table and a bending-die in line with said scarfing-rolls, bending-rolls at one side of said transfer-table, said table and die being separable, means for moving said table laterally, and mechanism for discharging the plate laterally from said table.

4. In a scarfing and bending device, the combination of scarfing-rolls, a transfer-table and bending-die in line with said scarfing-rolls, said transfer-table and bending-die being mounted on a two-part carriage separable on an inclined line, mechanism for moving said table laterally, bending-rolls at one side of said table, and means for discharging the plate from said table to said bending-rolls.

5. In a scarfing and bending device, the combination of the scarfing-rolls, a transfer-table and bending-die in line with said scarfing-rolls, a carriage on which said rolls, table and die are mounted, mechanism for moving said carriage laterally, said carriage being formed in sections and divided between the bending-die and transfer-table, bending-rolls at one side of said table, and means for discharging the plate from said table to said bending-rolls.

6. In a scarfing and bending device, the combination of the scarfing-rolls, a laterally-movable table, bending-rolls at one side of said table, and mechanism for discharging the plate from said table and to said rolls.

7. In a scarfing and bending device, the combination of the scarfing-rolls, a laterally-movable table, tilting arms mounted on said table, bending-rolls at one side of said table, and means for tilting said arms to discharge the plate from said table.

8. In a scarfing and bending device, the combination of the scarfing-rolls, a laterally-movable table, tilting arms pivoted on said table and provided with angle portions, bending-rolls at one side of said table, and abutments against which the bent portion of the tilting arms will strike to discharge the plate from the table.

9. In a scarfing and bending device, the combination of the scarfing-rolls, a laterally-movable table, tilting arms pivoted on said table and provided with downwardly-projecting portions, bending-rolls at one side of said table, inclined skids leading to said rolls, and abutments under said skids and in position to have the downwardly-bent portions of the tilting arms strike against the same, whereby said arms will be tilted and the plate discharged onto said skids.

10. In a scarfing and bending device, the combination of the scarfing-rolls, a bending-die in line therewith, a transfer-table intermediate the bending-die and scarfing-rolls, power-driven feed-rollers on said table, tilting arms mounted on said table, bending-rolls at one side of said table, mechanism for moving said table laterally, and means for tilting said arms to discharge the plate from said table.

11. In a scarfing and bending device, the combination of the scarfing-rolls, a bending-die in line with said rolls, a transfer-table intermediate said rolls and die, a laterally-movable carriage on which said table, rolls and die are mounted, said carriage being separable at a point between said die and table, power-driven feed-rollers on said table, tilting arms pivoted on said table, bending-rolls at one side of said table, and abutments against which said arms will contact and tilt the same to discharge the plate from said table.

12. In a scarfing and bending device, the combination of the scarfing-rolls, a bending-die and draw-bench in line therewith, a transfer-table between the rolls and die, a carriage on which said rolls, table, dies and bench are mounted, said carriage being separable between said die and transfer-table, wheels on said carriage, a longitudinally-arranged power-driven shaft connected to some of said wheels for moving the carriage laterally, said longitudinal shaft being formed in sections and separably connected between the die and the transfer-table, bending-rolls at one side of said carriage, and means on said carriage for discharging the plate to said bending-rolls.

In testimony whereof we, the said PETER C. PATTERSON and JOHN J. BOAX, have hereunto set our hands.

PETER C. PATTERSON.
JOHN J. BOAX.

Witnesses:
ROBERT C. TOTTEN,
G. KREMER.